June 29, 1943.   E. PAYNE   2,323,237
TIRE INFLATING VALVE
Filed April 9, 1942   2 Sheets-Sheet 1

Inventor
ERNEST PAYNE,
By *Clarence A. O'Brien and Harvey B. Jackson* Attorneys

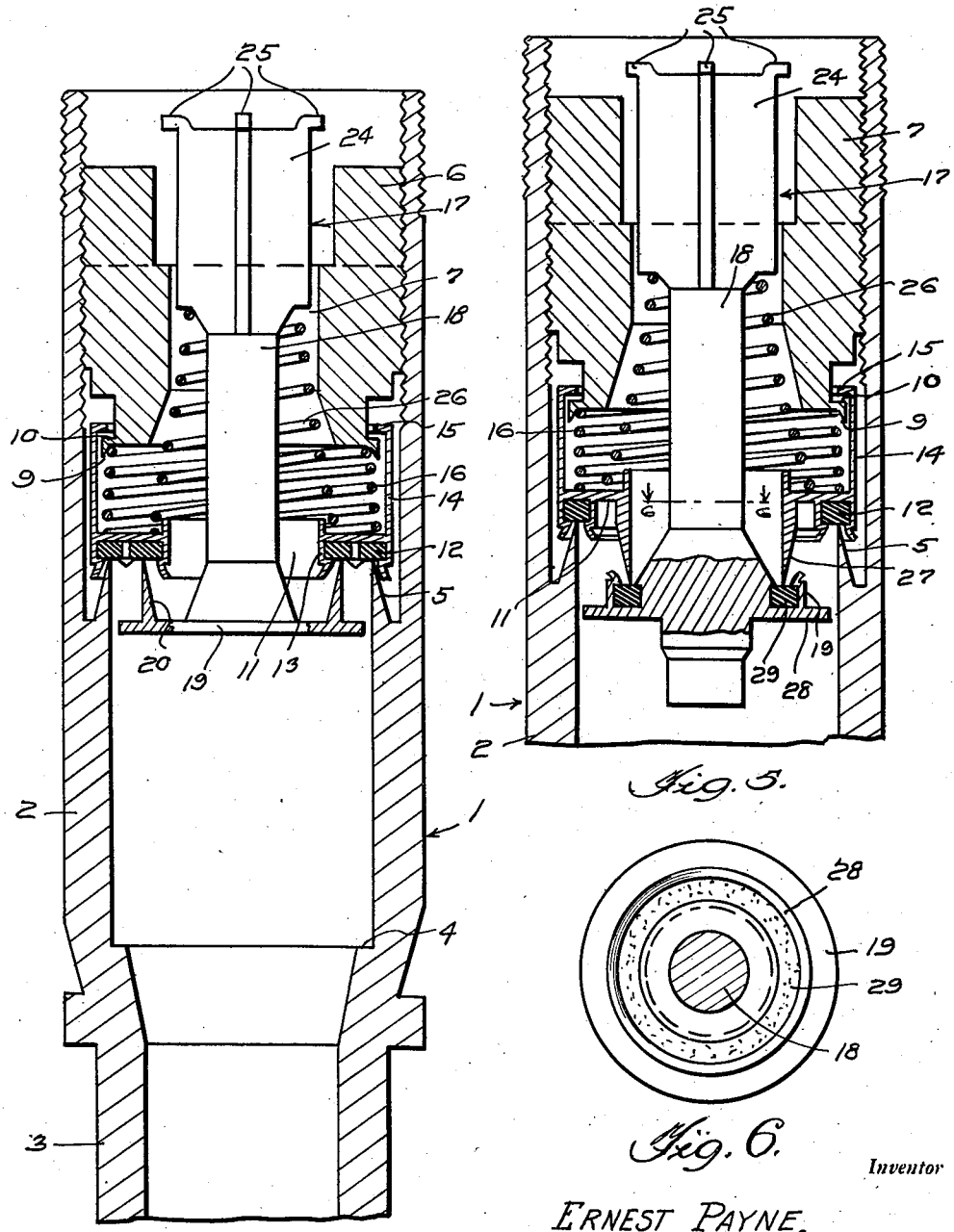

Patented June 29, 1943

2,323,237

UNITED STATES PATENT OFFICE 2,323,237

TIRE INFLATING VALVE

Ernest Payne, Repton, Ky.

Application April 9, 1942, Serial No. 438,336

1 Claim. (Cl. 137—69.5)

This invention pertains to tire inflating valves of a generally similar nature to that constituting the subject matter of my copending application Serial No. 423,839, filed on December 20, 1941, now Patent No. 2,306,495, granted December 29, 1942, upon which the present device constitutes an improvement.

An important object of the present invention is to provide a tire inflating valve of the aforementioned character which includes unique means for automatically lowering the air pressure in the tire in the event of over-inflation, thus preventing blowouts in addition to promoting riding comfort and safety.

Other objects of the invention are to provide a tire inflating valve of the character set forth which will be simple in construction, compact, highly efficient and reliable, and which may be produced at low cost.

The foregoing and other objects of the invention will become apparent from a study of the following specification, taken in connection with the accompanying drawings wherein like characters of reference designate corresponding parts throughout the several views, and wherein:

Figure 4 is a view in vertical section through another embodiment of the valve.

Figure 5 is a vertical sectional view through still another modification.

Figure 6 is a view in horizontal section, taken substantially on the line 6—6 of Figure 5.

Figure 1:
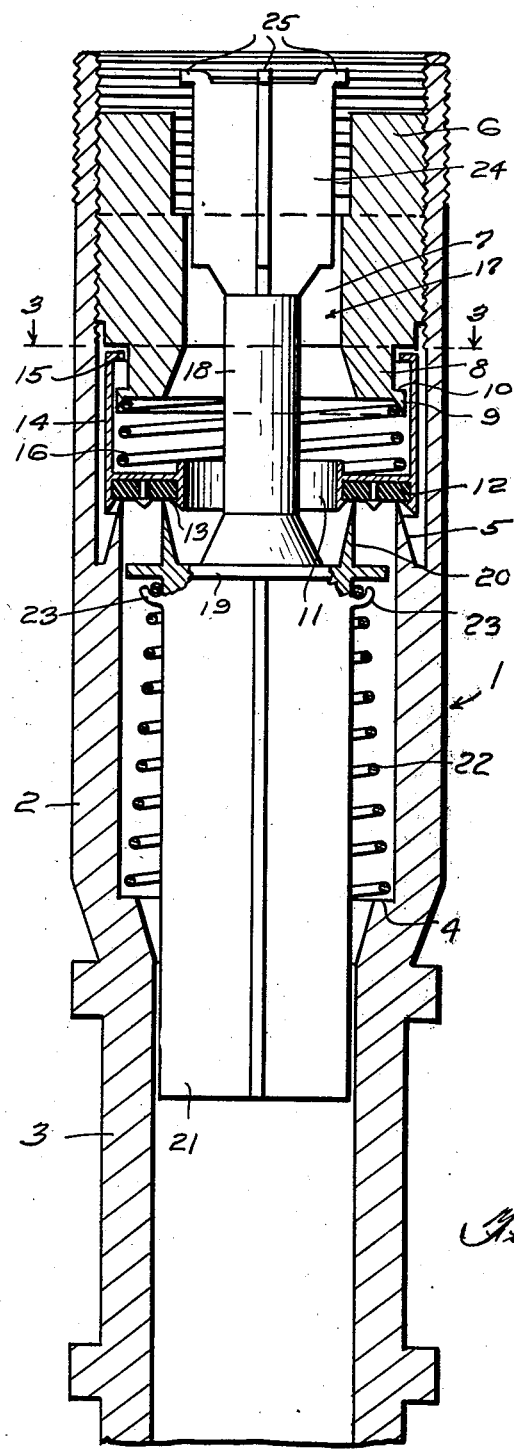
Figure 1 is a view in vertical section through an embodiment of the improved valve.
Figure 2:
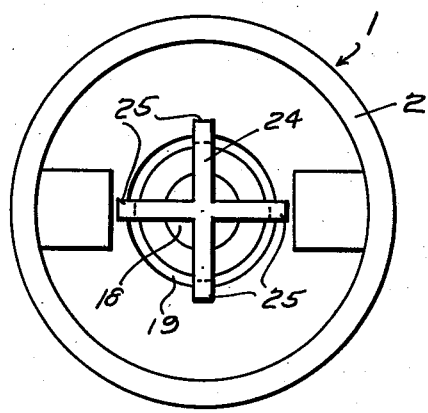
Figure 2 is a top plan view thereof.
Figure 3:
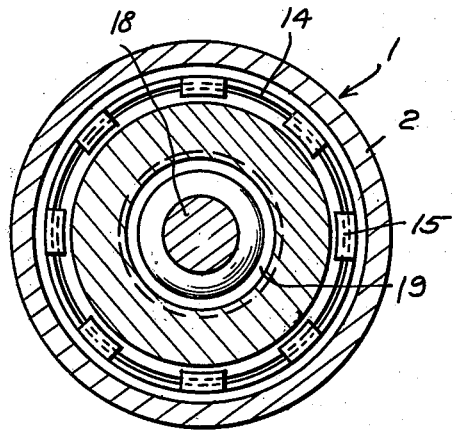
Figure 3 is a view in horizontal section, taken substantially on the line 3—3 of Figure 1.

Referring now to the drawings in detail, and to Figures 1 to 3, inclusive, thereof in particular, it will be seen that reference numeral 1 designates generally a tubular metallic casing. The casing 1 comprises comparatively large and small upper and lower portions 2 and 3, respectively. At substantially the point where the portions 2 and 3 merge, the casing 1 has formed therein a shoulder 4. At an intermediate point, the upper portion 2 of the casing 1 is internally reduced and formed to provide a seat 5.

Threadedly mounted for adjustment in the upper portion of the casing 1 is a removable plug 6 having a centrally located opening 7 extending therethrough. The plug 6 comprises a reduced lower end portion 8 having a flange 9 on its lower end providing a shoulder 10. This is illustrated to advantage in Figure 1 of the drawings.

Operable below the plug 6 in the upper portion 2 of the casing 1 is an annular channel member constituting a relief valve 11 having mounted in its lower portion a sealing ring 12 of rubber or other suitable material which is engageable on the seat 5. Also mounted in the lower portion of the annular relief valve 11 is a resilient seat 13 of rubber or other suitable material which is concentric with the sealing ring 12. Rising from the relief valve 11 is a ring 14 which slidably encircles the reduced lower portion 8 of the plug 6 with the flange 9 thereon. At its upper end, the ring 14 is provided with an internal notched flange 15 which is engageable with the shoulder 10 for connecting the relief valve 11 to the plug 6. A coil spring 16 is provided between the plug 6 and the channel-shaped relief valve 11 for engaging the sealing ring 12 on the seat 5. The flange 9 extends downwardly from the plug 6 in a manner to encircle and retain the upper end of the coil spring 16.

Also mounted in the casing 1 is a core 17. The core 17 includes a stem 18 which is operable in the passage 7 in the plug 6 and which extends downwardly through the annular, substantially channel-shaped relief valve 11. On the lower end of the stem 18 is an inflating valve member 19 in the form of a disc having thereon an upstanding beveled ring 20 which is engageable with the seat 13. Depending from the inflating valve member 19 and slidably engaged in the reduced lower portion 3 of the casing 1 is a guide 21 of substantially cross-shaped horizontal section. Encircling the guide 21 and resting on the shoulder 4 is a coil spring 22. The upper end of the coil spring 22 is engaged beneath the inflating valve member 19 for pressing the ring 20 upwardly toward the seat 13. Fingers 23 connect the coil spring 22 to the guide 21.

The stem 18 comprises an upper portion 24 constituting a guide of substantially cross-shaped horizontal section which is slidable in the passage 7 of the plug 6. On the upper end of the guide 24 are outwardly bent lugs 25 which are engageable with the plug 6 for lifting the core 17 out of the casing 1 with said plug when it is removed.

In operation, the nozzle of a conventional air hose is engaged in the customary manner with the upper end of the casing 1 and the stem 18 is forced downwardly against the tension of the spring 22 for disengaging the ring 20 from the seat 13, thus opening the valve member 19 for inflating the tire. Of course, when the air hose is removed, the inflating valve member 19 is immediately closed again by the spring 22. Should the pressure of the air in the tire be sufficient to overcome the tension of the coil spring 16, the relief valve 11 is raised out of engagement with the seat 5 for permitting the escape of the excess air upwardly around the ring 14, then downwardly around the reduced portion 8 of the plug 6, and then upwardly through the passage or opening 7 in said plug. When the tire has thus been sufficiently deflated, the coil spring 16 closes the relief valve 11 on the seat 5. The tension of the coil spring 16 may be regulated as desired by adjusting the plug 6 in the casing 1. When the plug 6 is removed from the casing 1, the flange 9 engages the flange 15 and said plug engages the lugs 25 for picking up the entire relief valve and core assemblies for removing them in the one operation.

In the embodiment shown in Figure 4 of the drawings, a coil spring 26 which encircles the stem 18 has its lower end engaged on the substantially channel-shaped relief valve 11 and its upper end engaged beneath the guide 24 for closing the ring element 20 of the inflating valve 19 on the seat 13. Thus, the elements 21, 22 and 23 are omitted. In other respects, this form of the device is substantially similar in construction and operation to the embodiment illustrated in Figures 1, 2 and 3 of the drawings.

In the modification illustrated in Figures 5 and 6 of the drawings, the annular, substantially channel-shaped relief valve 11 has formed therein a seat in the form of a depending, beveled ring 27. Then, the inflating valve member 19 is formed to provide an annular channel 28 having mounted therein a resilient sealing ring 29 of rubber or other suitable material which is engageable with the seat 27. In other respects this modification is substantially similar in construction and operation to the embodiment shown in Figure 4 of the drawings.

It is believed that the many advantages of an improved tire inflating valve constructed in accordance with the present invention will be readily understood, and although preferred embodiments of the device are as illustrated and described, it will be understood that changes in the details of construction and in the combination and arrangement of parts may be resorted to which will fall within the scope of the invention as claimed.

What is claimed is:

A tire inflating valve comprising a tubular casing, a seat in said casing, a removable plug, having an opening therein, threadedly mounted for adjustment in the casing, said plug including a reduced lower end portion and an external flange on said lower end portion, an annular, substantially channel-shaped relief valve member operable in the casing and engageable with the seat, a ring on said relief valve member rotatably and slidably encircling the reduced end portion of the plug, an internal, notched flange on the ring engageable with the first named flange for connecting said relief valve member to said plug for removal therewith from the casing after an initial independent movement of said plug, a coil spring between the plug and the relief valve member for yieldingly engaging said relief valve member with the seat, a seat in the annular relief valve member, a stem extending through said annular relief valve member, a guide on one end of the stem operable in the plug, an inflating valve member on the other end of the stem engageable with the second-named seat, and a coil spring encircling the stem and having one end engaged with the relief valve member and its other end engaged with the guide for engaging the inflating valve member with the second-named seat.

ERNEST PAYNE.